United States Patent Office 2,789,978
Patented Apr. 23, 1957

2,789,978
DIMETHYLAMINOPROPYL-DIPYRIDOTHIAZANE

Stephen Rath, New York, N. Y.

No Drawing. Application July 15, 1954,
Serial No. 443,690

1 Claim. (Cl. 260—243)

This invention relates to new and improved therapeutically active organic heterocyclic compounds and has particular relation to compounds of this type, containing nitrogen and sulfur or nitrogen and selenium in the molecule.

It is one object of the present invention to provide compounds of the above mentioned type which contain a ring structure of the formula

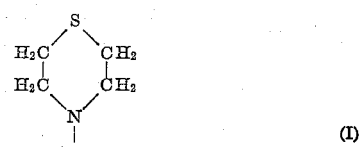

(I)

carrying a nitrogen-containing aliphatic radical attached to the nitrogen atom of the ring structure.

Another object of the invention is to provide compounds of the above mentioned type, in whch the ring structure of Formula I is present in a heterocyclic system of the formula

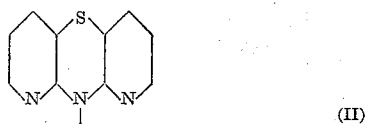

(II)

and carries a nitrogen-containing aliphatic radical attached to the nitrogen atom of the sulfur-containing ring.

It is also an object of the present invention to provide heterocyclic compounds of the above outlined character in which a nitrogen-containing aliphatic radical is attached to the nitrogen atom of a nitrogen- and selenium-containing heterocyclic system, e. g. a system of the formula

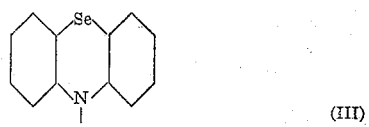

(III)

A still further object of the invention is to provide new and improved phenothiazine derivatives which carry a nitrogen-containing aliphatic radical attached to the nitrogen atom of the phenothiazine radical and in which novel chemical and therapeutical effects are obtained either by novel substituents in the phenothiazine radical, or by the novel character of the nitrogen-containing aliphatic radical, or by combination of phenothiazine derivatives with suitable acidic compounds to salt-like products.

The compounds according to the present invention are distinguished by relatively low toxicity and valuable physiological effects based on their capacity of stabilizing the negative and central nervous system, accompanied by essentially reduced side effects.

The following examples described some embodiments of the invention, to which the invention is not limited.

Example 1

75 grams of phenoselenazine, 15 grams of sodium amide, and 250 grams of xylene are heated to boiling under reflux and to the mixture 55 grams of 1-diethylamino-2-chloropropane dissolved in 55 grams of xylene are added during a period of about 1 hour, after which heating at boiling temperature under reflux is continued for about 45 to 60 minutes. The resulting product is cooled, mixed with about 800 grams of water and then acidified by the gradual addition of dilute aqueous hydrochloric acid. The xylene is separated from the aqueous layer and to the latter aqueous sodium hydroxide solution is added until strongly alkaline reaction. The reaction product formed is extracted by ether and recovered by evaporation from the ether solution.

The reaction product is the mixture of 2 isomers, i. e. the N-(2'-diethylamino-2'-methyl-ethyl)-derivative and the N-(2'-diethylamino-1'-methyl-ethyl)-derivative of phenoselenazine. In order to separate these isomers, the mixture of the free bases is dissolved in ethyl acetate, the dissolved bases are converted into the hydrochlorides with HCl gas and the resulting mixture of hydrochlorides is subjected to fractional crystallization from alcohol. The hydrochloride of the N-(2'-diethylamino-2'-methyl-ethyl)-derivative crystallizes first, and the isomer can be recovered from the mother liquors of crystallization.

Example 2

75 grams of phenoselenazine, 15 grams of sodium amide and 250 grams of xylene are heated to boiling under reflux and to the mixture 45 grams of 3-dimethylamino-1-chloropropane mixed with 45 grams of xylene are added during a period of about 1 hour, after which heating at boiling temperature under reflux is continued for about 40 to 60 minutes. The resulting product is cooled, mixed with 750 grams of water and then acidified by the gradual addition of dilute aqueous hydrochloric acid. The xylene is separated from the aqueous layer and to the latter aqueous sodium hydroxide solution is added until strongly alkaline reaction. The separated reaction product is dissolved in ether, recovered by evaporation and is reacted with hydrochloric acid to form the N-(3'-dimethyl-amino-propyl)-phenoselenazine hydrochloride.

Example 3

85.5 grams of 2-chloro-phenoselenazine, 15 grams of sodium amide and 250 grams of xylene are heated to boiling under reflux and to the mixture 45 grams of 3-dimethylamino-1-chloropropane mixed with 45 grams of xylene are added during a period of about 1 hour, after which heating at boiling temperature under reflux is continued for about 40 to 60 minutes. The resulting product is cooled, mixed with 750 grams of water and then acidified by the gradual addition of dilute aqueous hydrochloric acid. The xylene is separated from the aqueous layer and to the latter aqueous sodium hydroxide solution is added until strongly alkaline reaction. The separated reaction product is dissolved in ether, recovered by evaporation and is reacted with hydrochloric acid to form the N-(3'-dimethyl-amino-propyl)-2-chloro-phenoselenazine hydrochloride.

Example 4

80 grams of the compound of the formula

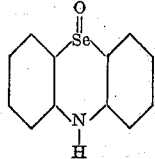

(IV)

15 grams of sodium amide and 250 grams of xylene are heated to boiling under reflux and to the mixture 45 grams of 3-dimethylamino-1-chloropropane mixed with 45 grams of xylene are added during a period of about 1 hour, after which heating at boiling temperature under reflux is continued for about 40 to 60 minutes. The resulting product is cooled, mixed with 750 grams of water and then acidified by the gradual addition of dilute aqueous hydrochloric acid. The xylene is separated from the aqueous layer and to the latter aqueous sodium hydroxide solution is added until strongly alkaline reaction. The separated reaction product is dissolved in ether, recovered by evaporation and is reacted with hydrochloric acid to form the hydrochloride.

Example 5

100 grams of N - (3' - dimethyl - amino) - propyl - 2 - chlorophenothiazine base are dissolved in ether and added to an aqueous solution containing 35 grams of $H_3PO_4$. The water-soluble salt thus formed is recovered by evaporation of the solution to dryness on the water bath.

Example 6

50.7 grams of adenyl triphosphoric acid dissolved in water, are reacted with 31.8 grams of N-(3'-dimethylamino)-propyl-2-chloro-phenothiazine to form the salt of the base.

Example 7

21.1 grams of creatine phosphoric acid dissolved in water, are reacted with 31.8 grams of N-(3'-dimethylamino)-propyl-2-chloro-phenothiazine to form a salt of the base.

Example 8

Diphenylamine sulfonic acid of the formula

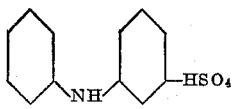

(V)

prepared from the corresponding diphenylamine diazosulfonic acid in conventional manner, is converted into the corresponding phenothiazine compound of the formula

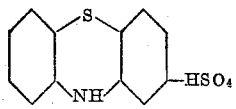

(VI)

by classical methods, e. g. by heating compound (I) with sulfur or sulfur chloride.

90 grams of compound (VI) are mixed with 250 grams of xylene and 15 grams of sodium amide and heated to boiling under reflux. To this mixture 45 grams of 3-dimethylamino-1-chloropropane mixed with 45 grams of xylene are added gradually within 1 hour and heating under reflux is further continued for 50–60 minutes. The reaction mixture is now cooled, after cooling taken up with about 750 cc of water and to the resulting mixture dilute aqueous sulfuric acid is added until slightly acid reaction. The xylene is separated by decanting and the aqueous layer is rendered strongly alkaline by the addition of aqueous sodium hydroxide solution in order to separate the base formed. The latter is taken up with ether and can be obtained by evaporation of the ether solution, conversion of the residue into the sulfate with dilute sulfuric acid.

The compound thus formed corresponds to the formula

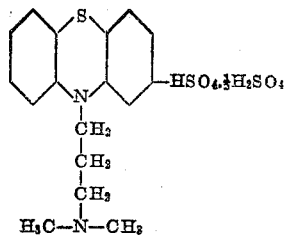

(VII)

Example 9

75 grams of the phenothiazine compound corresponding to the formula

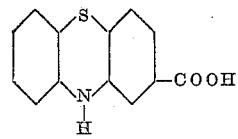

(VIII)

are mixed with 250 grams of xylene and 15 grams of sodium amide and heated to boiling under reflux. To this mixture 45 grams of 3-dimethylamino-1-chloro-propane mixed with 45 grams of xylene are added gradually within 1 hour and heating under reflux is further continued for 50–60 minutes. The reaction mixture is now cooled, after cooling taken up with about 750 cc of water and to the resulting mixture dilute aqueous sulfuric acid is added until slightly acid reaction. The xylene is separated by decanting and the aqueous layer is rendered strongly alkaline by the addition of aqueous sodium hydroxide solution in order to separate the base formed. The latter is taken up with ether and can be obtained by evaporation of the ether solution and conversion of the residue into the sulfate.

Example 10

$\frac{1}{10}$ mol of the N - (3' - dimethyl - amino) - propyl - 2 - chlorophenothiazine base is dissolved in ether and gradually added to the solution of $\frac{1}{10}$ mol of glutamic acid in water. The reaction product is recovered in solid form by evaporation of the solution.

Compounds of the phenothiazine derivative used as starting material in this example, can be prepared with glutamine, alanine, glycine, lysine, aspartic acid, and other amino acids, in a substantially similar manner.

Example 11

40 grams 2-chloro-phenothiazine are mixed with 120 grams of xylene and 7 grams of sodium amide and heated to boiling under reflux. Into the boiling liquid 25 grams of γ-chloro-butyramide mixed with an equal weight of xylene are gradually introduced within 1 hour, and heating under reflux is continued for a further hour. The reaction is now cooled, mixed with about 500 grams of water and slightly acidified by the gradual addition of dilute hydrochloric acid. The xylene is separated by decanting from the aqueous phase, which is then rendered alkaline with aqueous sodium hydroxide solution. The separated base is extracted with ether, recovered by evaporation, and converted into its hydrochloride.

Analogous compounds can be obtained in similar manner by substituting monomethyl butyramide or dimethylamino propionamide for the γ-chloro-butyramide used in this example.

Example 12

40 grams of 2-chloro-phenothiazine are mixed with 120 grams of xylene and 7 grams of sodium amide and heated to boiling under reflux. Into the boiling liquid 30 grams of α-chloro-glutaric acid half amide mixed with an equal weight of xylene are gradually introduced within 1 hour, and heating under reflux is continued for a further hour. The reaction mixture is now cooled, mixed with about 500 grams of water and slightly acidified by the gradual addition of dilute hydrochloric acid. The xylene is separated by decanting from the aqueous phase, which is then rendered alkaline with aqueous sodium hydroxide solution. The separated base is extracted with ether, recovered by evaporation and converted into its hydrochloride.

The resulting compound corresponds to the formula

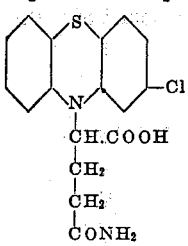

Example 13

30 grams of phenothiazine are mixed with 120 grams of xylene and 7 grams of sodium amide and heated to boiling under reflux. Into the boiling solution 30 grams of 1,3 - N,N,N′,N′ - tetramethylamino - 2 - chloro - propane mixed with an equal weight of xylene are gradually introduced within 1 hour, and heating under reflux is continued for a further hour. The reaction mixture is now cooled, mixed with about 500 grams of water and slightly acidified by the gradual addition of dilute hydrochloric acid. The xylene is separated by decanting from the aqueous phase, which is then rendered alkaline with aqueous sodium hydroxide solution. The separated base is extracted with ether, recovered by evaporation, and converted into its hydrochloride.

The resulting compound corresponds to the formula

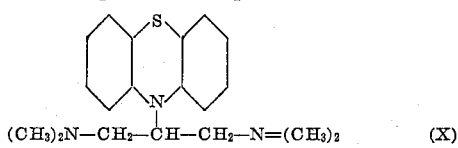

Example 14

15 grams of para-thiazine of the formula

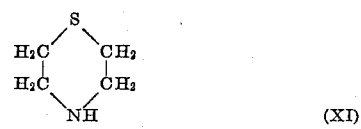

are mixed with 100 grams of xylene and 7 grams of sodium amide and heated to boiling under reflux. To the boiling solution a mixture of 23 grams of 3-dimethylamino-1-chloro-propane with 23 grams of xylene are gradually added during a period of 45–60 minutes and heating under reflux is then continued for about 45–60 minutes. The reaction mixture is now cooled and after cooling mixed with about 400 cc. of water. The resulting mass is slightly acidified by the gradual addition of dilute aqueous hydrochloric acid. The xylene is separated from the aqueous layer by decantation and to the aqueous layer caustic soda solution is added until it becomes strongly alkaline. The separated base is extracted with ether and is then further treated in a manner similar to that described in the above examples.

Example 15

Imino -2,2′-dipyridil of the formula

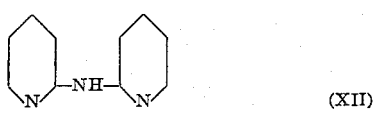

is heated with sulfur in order to convert it into a compound corresponding to the formula

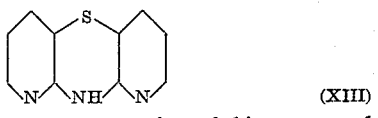

The procedure used in the preparation of this compound is substantially similar to the process used for converting diphenylamine into phenothiazine.

65 grams of compound (XIII), 15 grams of sodium amide and 250 grams of xylene are reacted with 45 grams of 3-dimethylamino-1-chloropropane in the manner described in the above Example 2. By a procedure similar to that described in said Example 2, a compound corresponding to the formula

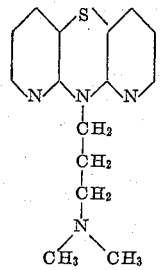

is obtained.

Example 16

90 grams of the compound corresponding to the formula

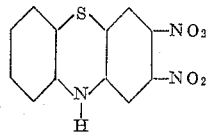

15 grams of sodium amide, and 250 grams of xylene are reacted with 45 grams of 3-dimethylamino-1-chloropropane in the manner described in the above Example 2. By treating the reaction product in the manner described in said example, a compound of the formula

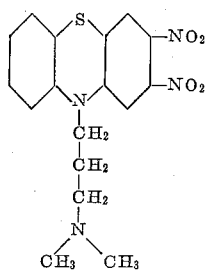

is obtained.

Example 17

90 grams of the compound corresponding to the formula

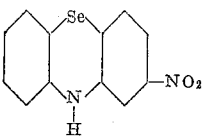

15 grams of sodium amide, and 250 grams of xylene are reacted with 45 grams of 3-dimethylamino-1-chloropropane in the manner described in the above Example 2. By treating the reaction product in the manner described in said example, a compound of the formula

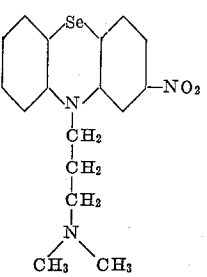

is obtained.

It will be understood from the above that the invention is not limited to the above described specific starting materials, proportions, solvents, procedures and other details specifically described and can be carried out with various modifications. For example, instead of the 3-dimethyl-amino-1-chloropropane used in Examples 4, 8 and 9, analogous compounds, e. g. 1-diethylamino-2-chloropropane can be used. The proportions between the acid and base reactant in Examples 5, 6 and 7 can be varied and a mixture of acid reactants can be used. Furthermore, the salt-like compounds described in Examples 5, 6, 7 and 10 can be formed also with the bases prepared according to the other of the above examples. These and other modifications can be made without departing from the scope of the invention as defined in the appended claims.

The term sodium amide denotes in the present application a commercial product containing about 85% of $NaNH_2$.

What is claimed is:
As a product, a compound of the formula

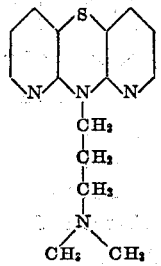

References Cited in the file of this patent
UNITED STATES PATENTS

| | | |
|---|---|---|
| 2,375,628 | D'Alelio et al. | May 8, 1945 |
| 2,439,749 | Niederl | Apr. 13, 1948 |
| 2,519,886 | Charpentier | Aug. 22, 1950 |
| 2,525,416 | Levesque | Oct. 10, 1950 |
| 2,532,561 | Langkammerer | Dec. 5, 1950 |
| 2,580,411 | Cusic | Jan. 1, 1952 |
| 2,675,382 | Melamed | Apr. 13, 1954 |